United States Patent [19]

Stacey

[11] Patent Number: 4,935,686
[45] Date of Patent: Jun. 19, 1990

[54] AC MOTOR DRIVE WITH SWITCHED AUTOTRANSFORMER COUPLING

[75] Inventor: Eric J. Stacey, Penn Hills Township, Allegheny County, Pa.

[73] Assignee: Westinghouse Electric Corp., Pittsburgh, Pa.

[21] Appl. No.: 395,629

[22] Filed: Aug. 18, 1989

[51] Int. Cl.$^5$ .......................... H02P 5/28; H02P 1/12
[52] U.S. Cl. .................................... 318/801; 318/780; 318/771; 318/711
[58] Field of Search ................... 318/6, 700, 711, 715, 318/717, 720, 721, 722, 724, 727, 768, 771, 780, 798, 729, 800, 801, 802, 813

[56] References Cited

U.S. PATENT DOCUMENTS

| | | | |
|---|---|---|---|
| 774,954 | 11/1904 | Scott | 318/720 |
| 1,280,624 | 10/1918 | Alexanderson | 318/780 |
| 3,351,835 | 11/1964 | Borden | 318/798 |
| 3,421,062 | 1/1969 | Dickey | 318/700 |
| 3,527,990 | 9/1970 | Gasser | 318/6 |
| 3,560,834 | 2/1971 | Stoutmann | 363/95 |
| 4,644,242 | 2/1987 | Takata et al. | 318/771 |
| 4,766,359 | 8/1988 | Smith et al. | |

Primary Examiner—William M. Shoop, Jr.
Assistant Examiner—John W. Cabeca
Attorney, Agent, or Firm—R. P. Lenart

[57] ABSTRACT

An ac drive in which the three phase ac current produced by a current controlled inverter is applied to the stator winding of a synchronous or induction motor through an autotransformer equipped with a neutral shorting switch. For starting from zero speed and operation at very low speeds below the speed at which the autotransformer could provide adequate volt-seconds for operation of the motor, the neutral shorting switch is opened so that the current is applied essentially directly to the stator. At normal and high speeds, the neutral shorting switch is closed so that the voltage to the motor stator is increased by the turns ratio of the autotransformer thereby increasing the speed range of the motor. By providing a number of sets of taps on the autotransformer each with a neutral shorting switch, the ac drive mimics the characteristics of a drive with a multi-ratio gear box.

15 Claims, 3 Drawing Sheets

AC MOTOR DRIVE WITH SWITCHED AUTOTRANSFORMER COUPLING

Background of Invention

1. Field of the Invention

This invention is directed to ac motor drives employing current controlled inverters and more particularly to arrangements for starting and low speed operation of such ac motor drives and for increasing the maximum speed attainable with a current controlled inverter of a given rating. The invention is also directed to providing several ranges of torque and speed with such ac drives.

2. Background Information

Inverters are now used to provide variable frequency ac power for controlling the speed of ac motors. For synchronous motor drives, maximum torque can be developed when the inverter is controlled to provide a balanced set of stator currents which are phase locked in phase with respect to the rotor position. To provide these currents, a set of current reference waveforms for the inverter is developed based on rotor position and closed loop feedback is employed around the inverter.

U.S. Pat. No. 4,766,359 discloses such an ac drive for a synchronous machine. Actually, the system described in this patent is a dc link starter generator system for an aircraft. In the generator mode, the synchronous machine is gear driven by the aircraft engine to generate variable frequency power which is converted to high quality constant frequency power by a dc link inverter. In the start configuration shown in the patent, the connection of the inverter is reversed, the dc link power is obtained from another source, such as a battery or ground power unit, and the inverter provides controlled current to the machine which provides torque to start and accelerate the aircraft engine.

The starter configuration of the system described in U.S. Pat. No. 4,766,359 has wider application as an ac drive system for synchronous motors. To implement the inverter used in such a system with the capability of producing controlled current to feed high speed motors having very low impedances, fast semiconductor switches such as transistors are required. However, because fast switching devices have limited voltage capability, the maximum speed at which a particular synchronous machine can be driven is limited by the maximum inverter output voltage. To extend the speed range, and or to make use of a standard machine rated for a higher voltage, a transformer could be used. Since the voltage required to drive a synchronous machine is essentially proportional to frequency, an appropriately designed transformer will work well over a wide range of speeds. However, the volt-seconds required by a synchronous machine at very low speeds increases rapidly and approaches infinity at zero speed due to the resistance of the machine. Because a transformer has limited volt-second capability, it obviously cannot operate at zero frequency, and is not suitable for very low speed operation. This would require then that the transformer be switched out of circuit for starting and very low speed operation. Such an arrangement would be cumbersome and heavy.

It would be desirable to extend the speed range of an ac drive with a current controlled inverter of a given rating.

It would also be desirable to have such an ac drive with an extended speed range, but which would still be able to develop full torque at standstill and low frequencies.

In addition, it would be desirable to have such an ac drive which was compact and not excessively heavy.

It would be further desirable to have such an ac drive wherein the torque available would be adjustable over several ranges.

It would also be desirable to have such an ac drive with the above features for induction as well as synchronous motors.

Summary of the Invention

These desires and others are realized by the invention which is directed to a three phase ac drive having an autotransformer connecting the current controlled inverter to the motor stator winding. The three phase windings of the autotransformer are wye connected at one end with the other ends connected to the three phases of the stator winding. Taps on the autotransformer windings are connected to the three phases of the current controlled inverter. For start up and low speed operation, a switch disconnects the wye connected ends of the autotransformer windings from each other. The portions of the autotransformer windings between the taps and the ends connected to the motor then become inductors in series with the stator windings. These inductors rapidly saturate so that the necessary volt-seconds can be delivered to the stator windings. At high speed, the switch is closed to increase the voltage to the motor. This extends the speed range of the motor while maintaining the torque for startup and very low speed operation. The speed at which the switch is closed extends over a wide range. The switch cannot be closed before sufficient speed is attained to deliver through the autotransformer the volt-seconds required by the motor. On the other hand, in order to continue to increase the speed, the switch must be closed as the back emf (electromotive force) generated by the motor approaches the maximum voltage that can be generated by the current controlled inverter.

The invention is especially applicable to a synchronous motor where the three phase current produced by the current controlled inverter is phase locked at a selected phase angle to the motor rotor position. With the switch opening the wye connection of the autotransformer windings, the autotransformer rapidly saturates as current is delivered directly to the stator windings to generate starting torque. Depending upon the voltage ratio of the autotransformer, increased torque will be produced at zero and low speeds. Since the inverter ac voltage is sufficient to overcome the back emf of the motor over a significant range of speed, it is possible to take advantage of the increased torque over a significant range of speed. Once the neutral shorting switch is closed the autotransformer will operate normally increasing the voltage and reducing the current provided to the machine.

The invention is also applicable to an induction motor in which a slip frequency is added to the motor frequency feedback signal to control generation of the reference waveform for the inverter. Again the neutral shorting switch is open for startup and low frequency operation, and is closed for normal and high speed operation, thus also providing increased torque at low speed and extending the speed range of the motor.

Brief Description of the Drawings

A full understanding of the invention can be gained from the following description of the preferred embodiments when read in conjunction with the accompanying drawings in which.

Description of the Preferred Embodiment

Figure 1:
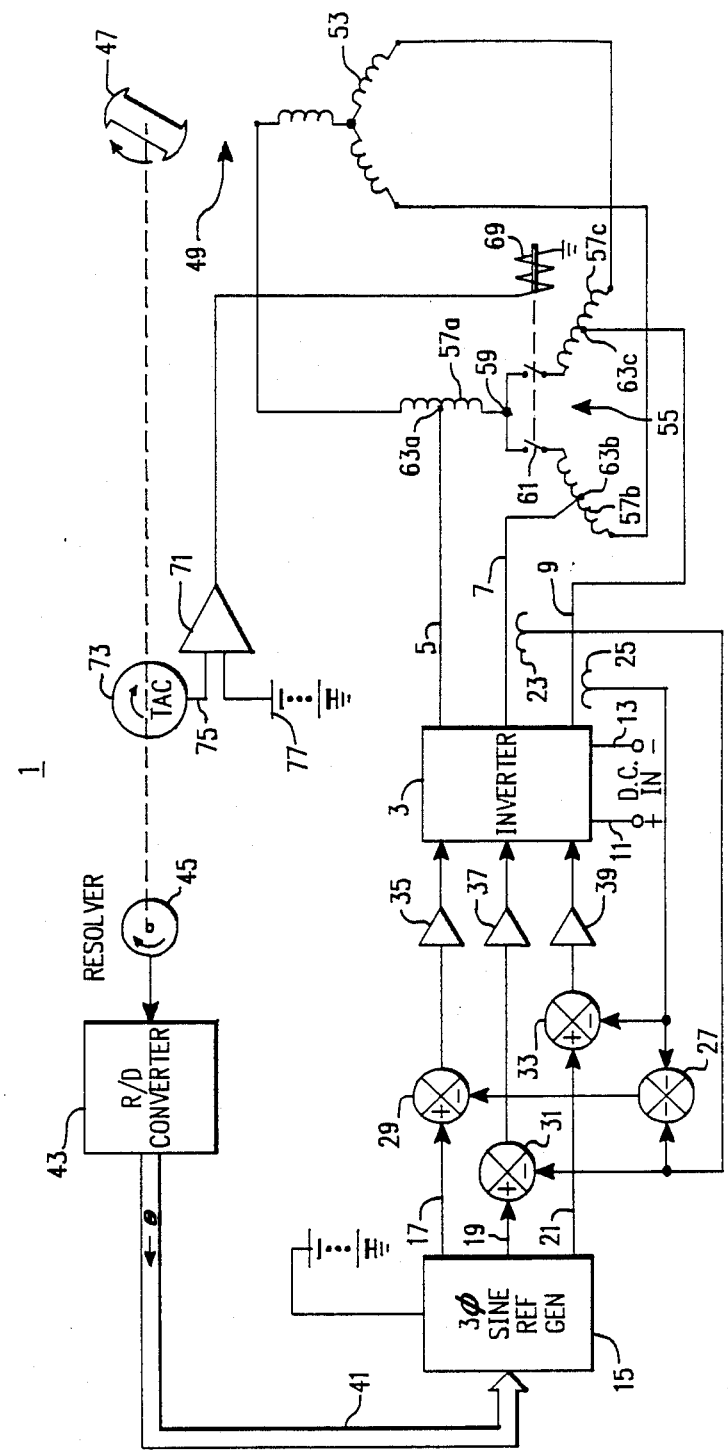
FIG. 1 is schematic diagram of an ac drive for a synchronous motor incorporating the subject invention.

FIG. 1 illustrates schematically a controlled current synchronous motor drive 1 incorporating the invention. A three phase dc link current controlled inverter 3 generates three phase ac power on output leads 5, 7, and 9 from dc power supplied on input leads 11 and 13 from a dc source (not shown). This dc source may be, for example, a three phase converter which generates the dc power form a commercial ac source.

A three phase sine wave reference generator 15 generates a three phase control signal for the inverter 3 on leads 17, 19 and 21. Current sensors 23 and 25 generate current feedback signals for two phases of the current generated by the inverter 3. The two signals are applied to summer 27 which generates a current feedback signal for the third phase. The current feedback signals are subtracted in summing junctions 29, 31 and 33 from the three phase sine wave reference signal produced by reference generator 15 to generate error signals, $i_a$ error, $i_b$ error, and $i_c$ error which are amplified by operational amplifiers 35, 37 and 39 for input to the inverter 3.

The three phase sine wave reference generator 15 includes a ROM look up table which generates the three phase reference signal at a frequency controlled by a digital rotor position signal $O_r$ provided on bus 41. The signal $O_r$ is generated by a resolver to digital converter 43 from an analog shaft position signal produced by a resolver 45 driven by the rotor 47 of the synchronous motor 49. The three phase reference signal is generated at a fixed phase angle with respect to the rotor selected to produce a desired torque. The magnitude of the reference waveforms is set by a reference voltage 51.

Thus, the reference waveforms generated by the reference generator 15 are phase locked to the position of the rotor 47 of the synchronous motor 49. These reference waveforms are fed as control signals to the inverter 3. The closed loop current feedback from the inverter output ensures that the current fed to the stator windings 53 of the motor 49 corresponds to the reference. With this type of control, the inverter output currents will follow the reference waveforms so that useful torque can be produced at speeds ranging from zero to a maximum. Maximum speed is reached when the back emf of the motor 49 increases to match the maximum voltage that can be produced by the inverter.

The synchronous motor ac drive 1 described to this point is similar to that shown in U.S. Pat. No. 4,766,359. In order to increase the maximum speed of the motor with an inverter of a given rating without reducing the starting and low speed torque, a switched neutral autotransformer 55 is connected in the leads 5, 7 and 9 between the inverter 3 and the stator windings 53. The autotransformer 55 has three windings 57a, 57b and 57c which are wye connected at one end at a neutral node 59 through a two pole neutral shorting switch 61. The other ends of the windings 57a, 57b and 57c are connected individually to one phase of the wye connected stator windings 53 of the motor 49. Taps 63a, 63b and 63c on the autotransformer windings are connected to the output leads 5, 7 and 9, respectively, of the inverter 3. The turns ratio of the autotransformer is equal to the number of turns between the taps 63 and the neutral node to the total number of turns in the autotransformer windings 59. The autotransformer 55 is connected to increase the voltage and reduce the current provided by the inverter to the motor when the switch 61 is closed. The autotransformer 55 is designed to match the rating of the motor 49 at normal speeds.

When starting up from zero speed or operating at very low speeds where the volt-second capability of the autotransformer would be exceeded, the neutral shorting switch 61 is opened. With the neutral opened, the inverter output current passes directly through the outer ends of the autotransformer windings 59a, 59b and 59c causing the core to saturate. With the inverter effectively coupled directly to the motor 49 there is no reduction of current due to the turns ratio of the autotransformer and maximum torque capability is automatically provided. At low speeds, the back emf produced by the machine is low and the inverter has more than enough voltage capability so that the transformer becomes saturated very rapidly. Because the inverter 3 is controlled to produce a defined current output, its voltage can rise rapidly when needed to saturate the autotransformer 55 so that the quality of the current waveform can be maintained when operating in this mode.

When operating as a drive starting from zero speed, the neutral shorting switch 61 remains open until the speed has increased to beyond the critical point where the autotransformer can generate the volt-seconds required by the stator. The switch 61 is then closed before the speed increases to the point where the back emf of the motor 49 begins to reduce current or limit speed. The actual speed at which the switch is closed is not critical, and if maximum torque is required at all times, the switching may be delayed until current limiting begins to take effect.

With the neutral shorting switch 61 closed, the voltage applied to the stator winding 53 is increased by the turns ratio of the autotransformer 55. Since the speed of the motor is a function of the voltage, the maximum speed of the motor is extended. As long as the torque generated by the motor exceeds the drag of the load, the speed of the motor will continue to rise until the transformed back emf again rises to match the maximum inverter output voltage. As long as sufficient power is available, the maximum starting torque and the maximum speed can be extended as required by appropriate selection of the transformer ratio.

Figure 2:
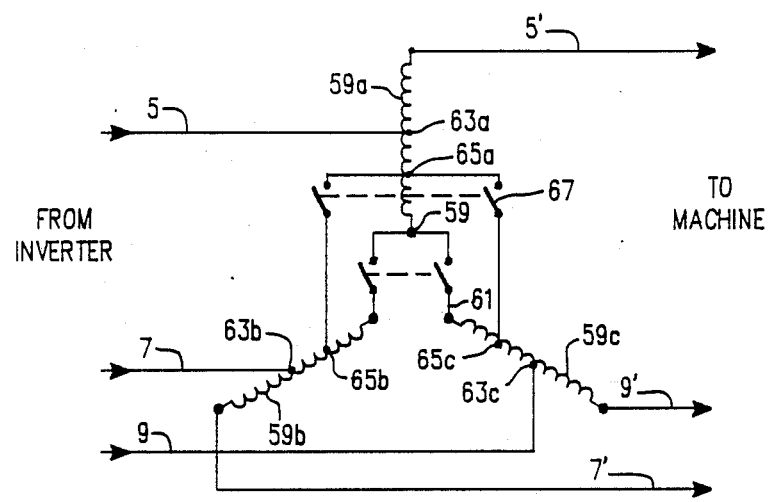
FIG. 2 is a modification to the autotransformer which forms a portion, of the ac drive shown in FIG. 1.

The effect of operating the neutral shorting switch 61 may be considered similar to shifting gears. A further extension of this scheme is illustrated in FIG. 2. As shown in FIG. 2, an additional set of "neutral" taps 65a, 65b and 65c are added to the autotransformer windings 59a, 59b and 59c. These taps are selectively connected together by a two pole switch 67. With the switch 67 closed and the switch 61 open, the turns ratio of the autotransformer 55 becomes the number of turns between the taps 63 and 65 to the number of turns between the taps 65 and the outer ends of the windings 59. Thus, the switches 61 and 67 can be used to change the effective "gear" ratio of the ac drive providing that the motor is designed to operate over the entire range of speed, voltage, and currents that are delivered to it in all the "gears". Additional "neutral" taps, any one of which may be shorted, could be provided for additional "gear" ratios.

If the maximum current produced by inverter 3 in the starting mode exceeds the rating of the motor 49, then the amplitude of the current reference 51, the amplitude of the current reference may be reduced by an amount corresponding to the transformer ratio while the neutral shorting switch 61 is open.

The neutral shorting switches 61, 67 may be implemented with either electromechanical or solid state devices. Control of these switches can be automated. For example, in FIG. 1, the switch 61 is an electromechanical relay having a coil 69 which is energized by a comparator 71 when the speed of the motor as measured by tachometer 73 which produces a speed signal on lead 75, exceeds a reference speed set by a reference voltage 77. Switching speed is chosen on the basis of the requirements of the particular system. Maximum switching speed can be obtained when the switch is not closed until a speed is reached at which the back emf of the motor matches the maximum voltage that can be generated by the inverter with the switch 61 open.

Figure 3:
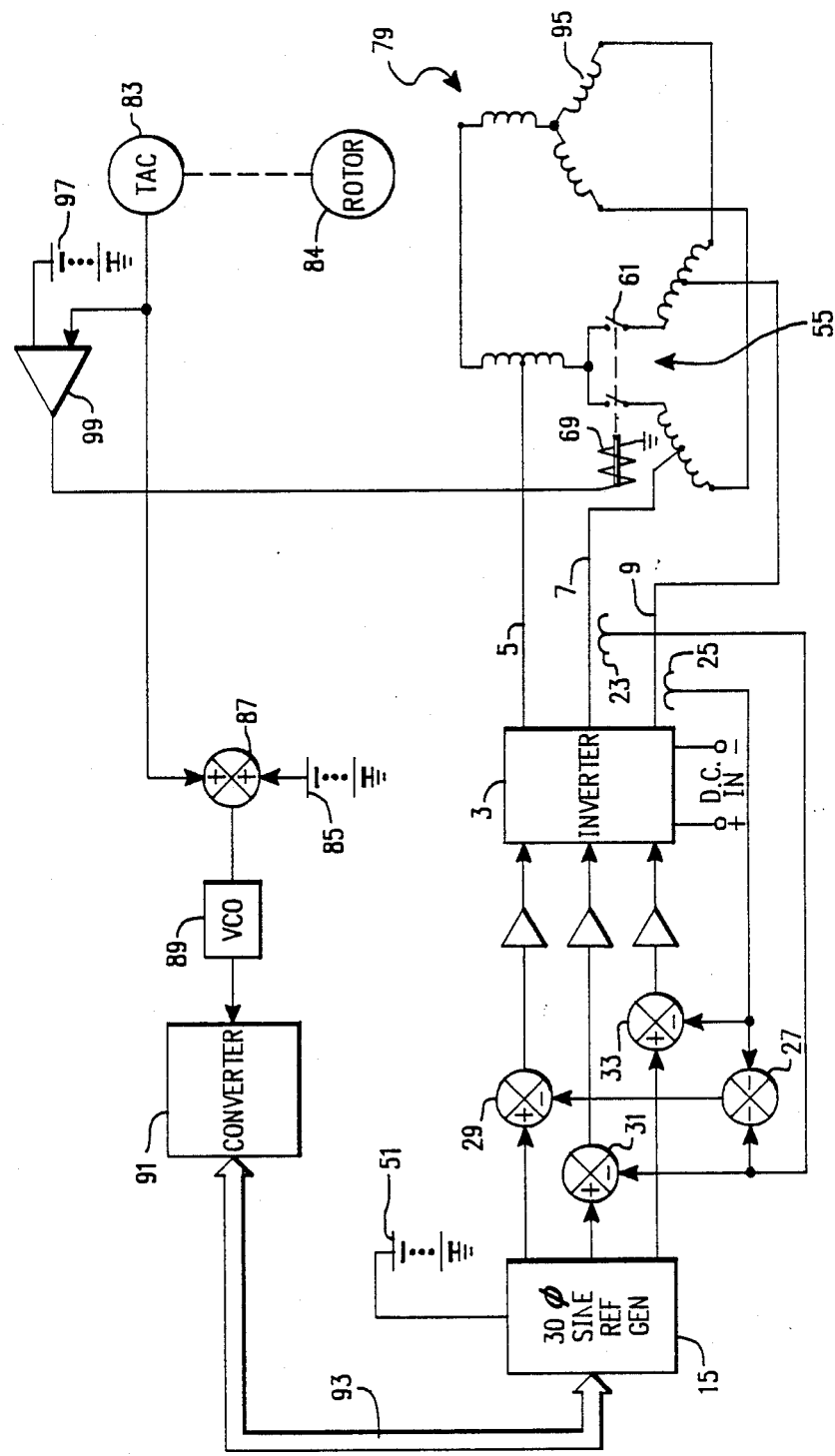
FIG. 3 a schematic diagram of an ac drive in accordance with the invention for an induction motor.

The invention can also be applied to an induction motor as shown in FIG. 3. For the induction motor 79, the three phase reference waveform generator 81 generates the reference waveforms at a frequency which is the sum of the motor frequency as determined by a tachometer 83 connected to the rotoal 84 and a slip frequency reference as set by voltage reference 85. The tachometer output and slip frequency reference signal are summed at summing junction 87 to produce an analog control signal which is converted to a pulse signal having a frequency proportional to the magnitude of the analog control signal by a voltage controlled oscillator (VCO) 89. The pulse signal produced by the VCO 89 is converted to a digital signal by a counter 91. The digital control signal is applied to the reference signal generator 81 over bus 93. As in the drive system of FIG. 1, the reference waveforms are used to control the current controlled inverter 3 in a negative feedback loop to produce a three phase output current which is applied through the switched neutral autotransformer 55 to the stator winding 95 of the induction motor 79. Like elements in the ac drive of FIG. 3 are given the same reference characters as those in the drive of FIG. 1.

The neutral shorting switch 61 is opened for starting at zero speed and for very low speed operation of the induction motor, the same as for the synchronous motor. Again, the switch 61 may be closed after the motor 79 has reached a speed at which the autotransformer can provide the required volt-seconds to the stator winding 95. The turns ratio of the autotransformer 55 may also be selected such that at a desired maximum speed of the induction motor 79, the motor back emf transformed by the autotransformer will match the maximum output voltage of the current controlled inverter 3. The neutral shorting switch 61 may be operated automatically by comparing the velocity signal generated by the tachometer 83 with a reference voltage 97 in a comparator 99 which controls the relay 61. In addition, multiple taps may be provided on the autotransformer 55 with corresponding taps on the three windings connected by additional neutral shorting switches as in the case of the synchronous motor to provide the effect of shifting "gears" as in the case of the synchronous motor.

As has been described, the invention permits the use of higher standard voltage machines with controlled current drives which require fast semiconductor switches having limited voltage ratings. The invention also provides an ac drive with a characteristics of a multi-ratio gear box. In addition, the invention enables higher speed operation without reducing starting torque. Another advantage provided by the invention is that it reduces the size of the feeder cables between the inverter and the motor stator due to the use of a higher voltage machine. This is a definite advantage for airborne applications where the motor may be located a substantial distance from the inverter.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A drive system for a three phase ac motor having a rotor and a three phase stator winding, said system comprising:

a three phase current controlled inverter;

a three phase autotransformer having three autotransformer phase windings each having two ends, with first ends wye connected together to a neutral node, and with the other ends of said three autotransformer phase windings connected to the three phase stator windings of the ac motor, each of said three auto transformer phase windings also having a tap connected to one of the three phases of said three phase current controlled inverter; and switch means selectively disconnecting said first ends of the three autotransformer phase windings from each other, said switch means being open to disconnect the first ends of said three autotransformer phase windings from each other to provide continuous torque front zero speed for startup of said ac motor and said switch being closed to connect the three autotransformer phase windings together for high speed operation of the ac motor.

2. The drive system of claim 1 wherein said taps on said three autotransformer phase winding are located such that the turns ratio of said autotransformer with the switch means closed connecting the first ends of the three autotransformer phase windings at the neutral node is such that the back emf of the ac motor at a selected maximum speed for the motor transformed by said autotransformer approaches the maximum voltage generated by the current controlled inverter.

3. The ac drive system of claim 2 including means responsive to the rpm of said motor to close said switch means connecting the first ends of said three autotransformer phase windings through said neutral node at a selected rpm.

4. The ac drive system of claim 3 wherein said means responsive to motor rpm closes said switch means at an rpm at which the back emf of the motor with said switch open approaches the maximum voltage of the current controlled inverter.

5. The ac drive system of claim 1 wherein said ac motor is a synchronous motor including a rotor, said drive system including means for sensing rotor position, and means responsive to said rotor position sensing means to control said inverter to generate a three phase current phase locked at a selected phase angle to said rotor.

6. The ac drive system of claim 5 including means responsive to the rpm of said motor to close said switch means at a selected motor rpm.

7. The ac drive system of claim 6 wherein said means responsive to motor rpm closes said switch means connecting the first ends of said three autotransformer phase windings together at said neutral node closes said switch means when the emf of said motor with said switch open approaches the maximum voltage generated by the current controlled inverter.

8. The ac drive system of claim 1 wherein said motor is an induction motor with a rotor and includes means determining the frequency of the induction motor, means setting a slip frequency, and means controlling said current controlled inverter to generate a three phase current at the frequency of the rotor plus said slip frequency.

9. The ac drive system of claim 8 including means responsive to said means determining motor frequency closing said switch means at a selected motor frequency.

10. The ac drive system of claim 9 wherein the selected motor frequency equals the motor frequency at which the back emf generated by said motor with said switch means open approaches the maximum voltage generated by said current controlled inverter.

11. The ac drive system of claim 9 wherein said taps on said autotransformer phase windings are placed to produce a turns ratio such that with said switch means closed the back emf generated by said motor at a selected maximum motor speed approaches the maximum voltage generated by the current controlled inverter.

12. An ac drive system for a three phase motor with a three phase stator winding, said system comprising:
a three phase current controlled inverter;
a three phase autotransformer with three autotransformer phase windings each having two ends with first ends wye connected together at a neutral node, and with the other ends connected to the three phase stator winding on said ac motor, each autotransformer phase winding having a first tap connected to the three phase current controlled inverter and a second tap between said first tap and said first end;
first switch means selectively disconnecting said first ends of said auto transformer phase windings from each other when open; and
second switch means selectively connecting said second taps on said three autotransformer phase windings to each other when closed; said first and second switch means both being open to disconnect said first ends of said autotransformer phase windings and said second taps from each other respectively for starting and at low speeds of said ac motor, said first switch means being closed to connect said first ends of the autotransformer phase windings at said neutral node and said second switch means being open for intermediate speeds of said ac motor, and said first switch means being opened and said second switch means being closed at higher speeds of said ac motor.

13. The ac drive system of claim 12 wherein said second taps on said three autotransformer phase windings are placed to provide a turns ratio such that with said first switch means open, and said second switch means closed to connect the second taps, the back emf generated by the ac motor at a selected maximum speed transformed by said autotransformer approaches the maximum voltage generated by the current controlled inverter.

14. The ac drive system of claim 13 including means responsive to the rpm of said ac motor to open both said first and second switch means below a first selected rpm, to close said first switch means at said selected first rpm, and to open said first switch means and close said second switch means at a second selected rpm.

15. The ac drive system of claim 14 wherein said first selected rpm is an rpm at which with both said first and second switch means open, the back emf generated by said ac motor approaches the maximum voltage generated by the current controlled inverter, and wherein said second selected rpm is the rpm at which with the first switch means closed and the second switch means open, the back emf generated by the ac motor transformed by the auto transformer approaches the maximum voltage generated by the current controlled inverter.

* * * * *